(12) United States Patent
Wurmfeld et al.

(10) Patent No.: US 11,281,872 B2
(45) Date of Patent: Mar. 22, 2022

(54) ACTIVATING AN OUTPUT COMPONENT TO INDICATE AN ORIENTATION OF A NEAR-FIELD COMMUNICATION (NFC)-CAPABLE TRANSACTION CARD

(71) Applicant: Capital One Services, LLC, McLean, VA (US)

(72) Inventors: David Kelly Wurmfeld, Fairfax, VA (US); Adam Koeppel, Washington, DC (US); Tyler Locke, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/947,778

(22) Filed: Aug. 17, 2020

(65) Prior Publication Data

US 2020/0380221 A1    Dec. 3, 2020

Related U.S. Application Data

(63) Continuation of application No. 16/507,624, filed on Jul. 10, 2019, now Pat. No. 10,747,970, which is a
(Continued)

(51) Int. Cl.
*G06K 5/00* (2006.01)
*G06K 7/10* (2006.01)
(Continued)

(52) U.S. Cl.
CPC ....... *G06K 7/10297* (2013.01); *G06Q 20/352* (2013.01); *H04B 5/0025* (2013.01); *H04W 4/80* (2018.02)

(58) Field of Classification Search
CPC .... G06K 7/10297; H04W 4/80; G06Q 20/352
(Continued)

(56) References Cited

U.S. PATENT DOCUMENTS 7,769,345 B2    8/2010    Johnson et al.
7,784,687 B2    8/2010    Mullen et al.
(Continued)

FOREIGN PATENT DOCUMENTS

CN    106127281 A    11/2016

OTHER PUBLICATIONS

Cervantes E., "How to Use NFC on Android," Apr. 24, 2017,11 pages. Retrieved from Internet:[URL:https://www.androidauthority.com/how-to-use-nfc-android-164644].
(Continued)

*Primary Examiner* — Ahshik Kim
(74) *Attorney, Agent, or Firm* — Harrity & Harrity, LLP

(57) ABSTRACT

A transaction card may monitor an amount of electric current induced in a first near-field communication (NFC) component of a transaction card. Electric current may be induced in the first NFC component when the first NFC component is within an electromagnetic field generated by a second NFC component of a transaction terminal. The transaction card may dynamically activate one or more output components associated with the transaction card based on the amount of electric current induced in the first NFC component. The one or more output components may indicate whether the transaction card can communicate with the transaction terminal. The transaction card may perform an action related to completing a transaction after determining that the amount of electric current induced in the NFC component satisfies a first threshold. The first threshold may indicate that the transaction card can communicate with the transaction terminal.

20 Claims, 8 Drawing Sheets

Related U.S. Application Data continuation of application No. 16/142,823, filed on Sep. 26, 2018, now Pat. No. 10,354,105, which is a continuation of application No. 15/812,841, filed on Nov. 14, 2017, now Pat. No. 10,108,827.

(51) Int. Cl.
*G06Q 20/34* (2012.01)
*H04B 5/00* (2006.01)
*H04W 4/80* (2018.01)

(58) Field of Classification Search
USPC .......................................... 235/380
See application file for complete search history.

(56) References Cited

U.S. PATENT DOCUMENTS

| | | |
|---|---|---|
| 7,946,477 B1 | 5/2011 | Ramachandran et al. |
| 9,026,048 B2 | 5/2015 | Royston et al. |
| 9,230,255 B1 | 1/2016 | Hanmer |
| 9,395,827 B2 | 7/2016 | Chatterjee |
| 10,108,827 B1 * | 10/2018 | Wurmfeld .......... G06K 7/10297 |
| 10,354,105 B2 | 7/2019 | Wurmfeld et al. |
| 10,747,970 B2 | 8/2020 | Wurmfeld et al. |
| 2004/0259499 A1 | 12/2004 | Oba et al. |
| 2006/0148404 A1 | 7/2006 | Wakim et al. |
| 2012/0220221 A1 | 8/2012 | Moosavi et al. |
| 2012/0329389 A1 | 12/2012 | Royston et al. |
| 2013/0281014 A1 | 10/2013 | Frankland et al. |
| 2013/0320080 A1 | 12/2013 | Olson et al. |
| 2014/0187148 A1 | 7/2014 | Taite et al. |
| 2015/0046324 A1 | 2/2015 | de la Cropte de Chanterac et al. |
| 2015/0154486 A1 | 6/2015 | McFarthing et al. |
| 2016/0156386 A1 | 6/2016 | Van et al. |
| 2016/0307189 A1 | 10/2016 | Zarakas et al. |
| 2017/0077996 A1 | 3/2017 | Kim et al. |

OTHER PUBLICATIONS

Extended European Search Report for Application No. EP18205802.4, dated Mar. 19, 2019, 8 pages.

* cited by examiner

ACTIVATING AN OUTPUT COMPONENT TO INDICATE AN ORIENTATION OF A NEAR-FIELD COMMUNICATION (NFC)-CAPABLE TRANSACTION CARD

RELATED APPLICATIONS

This application is a continuation of U.S. patent application Ser. No. 16/507,624, filed Jul. 10, 2019 (now U.S. Pat. No. 10,747,970), which is a continuation of U.S. patent application Ser. No. 16/142,823, filed Sep. 26, 2018 (now U.S. Pat. No. 10,354,105), which is a continuation of U.S. patent application Ser. No. 15/812,841, filed Nov. 14, 2017 (now U.S. Pat. No. 10,108,827), which are incorporated herein by reference.

BACKGROUND

Near-field communication (NFC) includes a set of communication protocols that permit two electronic devices to communicate. NFC devices may be used in contactless payment systems. Additionally, or alternatively, NFC devices may be used for social networking, such as for sharing contacts, photos, videos, and/or files. Additionally, or alternatively, NFC devices may function as electronic identity documents and/or keycards.

SUMMARY

According to some possible implementations, a transaction card may include one or more memories; and one or more processors, communicatively coupled to the one or more memories, to power on the transaction card when an amount of electric current induced in a first near-field communication (NFC) component of the transaction card satisfies a first threshold. The first NFC component may be communicatively coupled to the one or more processors. Electric current may be induced in the first NFC component when the first NFC component is within an electromagnetic field generated by a second NFC component of another device. The one or more processors may monitor the amount of electric current induced in the first NFC component after powering on the transaction card. The one or more processors may dynamically activate one or more output components associated with the transaction card based on the amount of electric current induced in the first NFC component in association with monitoring the amount of electric current. The one or more output components may indicate a degree to which the transaction card and the other device are communicatively coupled. The one or more processors may perform, based on the amount of electric current satisfying a second threshold, an action related to providing data to the other device.

The one or more processors may modulate output of the one or more output components based on the amount of electric current induced in the first NFC component. The one or more processors may modify output of the one or more output components from a first output to a second output based on the amount of electric current induced in the first NFC component. The first output may be different than the second output. The one or more processors may provide, to the other device, information related to an account associated with the transaction card to complete the transaction. The one or more processors may determine whether a possible error related to the transaction card or the other device is present based on monitoring the amount of electric current induced in the first NFC component.

The one or more processors may request, via the one or more output components, confirmation to complete the transaction after determining that the amount of electric current induced in the first NFC component satisfies the second threshold. The one or more processors may provide information to the other device to complete the transaction after requesting confirmation to complete the transaction. The one or more processors may determine that the amount of electric current induced in the first NFC component satisfies the second threshold based on monitoring the amount of electric current induced in the first NFC component. The one or more processors may perform the action after determining that the amount of electric current induced in the first NFC component satisfies the second threshold.

According to some possible implementations, a non-transitory computer-readable medium may store one or more instructions that, when executed by one or more processors, cause the one or more processors to monitor an amount of electric current induced in a first near-field communication (NFC) component of a transaction card. Electric current may be induced in the first NFC component when the first NFC component is within an electromagnetic field generated by a second NFC component of a transaction terminal. The one or more instructions, when executed by the one or more processors, may cause the one or more processors to dynamically activate one or more output components associated with the transaction card based on the amount of electric current induced in the first NFC component. The one or more output components may indicate whether the transaction card can communicate with the transaction terminal based on the amount of electric current induced in the first NFC component. The one or more instructions, when executed by the one or more processors, may cause the one or more processors to perform an action related to completing a transaction after determining that the amount of electric current induced in the NFC component satisfies a first threshold. The first threshold may indicate that the transaction card can communicate with the transaction terminal.

The one or more instructions, when executed by the one or more processors, may cause the one or more processors to activate a first output component, of the one or more output components, based on a first amount of electric current induced in the first NFC component, or activate a second output component, of the one or more output components, based on a second amount of electric current induced in the first NFC component. The first output component and the second output component may be different. The one or more instructions, when executed by the one or more processors, may cause the one or more processors to power on one or more components of the transaction card when the amount of electric current stored in a capacitor satisfies a second threshold.

The one or more output components may include one or more lights, one or more speakers, or one or more vibration motors. The one or more instructions, when executed by the one or more processors, may cause the one or more processors to modulate, in association with dynamically activating the one or more output components, output of the one or more output components by modulating at least one of a brightness of light output by a light associated with the transaction card, an intensity of a vibration of a vibration motor associated with the transaction card, or a loudness of a sound output by a speaker associated with the transaction card.

The one or more instructions, when executed by the one or more processors, may cause the one or more processors to determine that the amount of electric current induced in the first NFC component satisfied the first threshold for a threshold amount of time. The one or more instructions, when executed by the one or more processors, may cause the one or more processors to perform the action after determining that the amount of electric current induced in the first NFC component satisfied the first threshold for the threshold amount of time. The one or more instructions, when executed by the one or more processors, may cause the one or more processors to modify, in association with dynamically activating the one or more output components, output of the one or more output components by modifying at least one of a color of light output by a light associated with the transaction card, a pattern of a vibration output by a vibration motor associated with the transaction card, or a sound output by a speaker associated with the transaction card.

According to some possible implementations, a method may include powering on, by a transaction card, a processor of the transaction card when an amount of electric current induced in a first near-field communication (NFC) component of the transaction card satisfies a first threshold. Electric current may be induced in the first NFC component when the first NFC component is within an electromagnetic field generated by a second NFC component of another device. The method may include monitoring, by the transaction card, the amount of electric current induced in the first NFC component to permit the transaction card to determine whether the amount of electric current satisfies a second threshold. The second threshold may be associated with a threshold amount of electric current that permits the transaction card to communicate with the other device.

The method may include dynamically activating, by the transaction card, one or more output components associated with the transaction card based on the amount of electric current induced in the first NFC component. Output from the one or more output components may indicate whether the transaction card is oriented relative to the other device in a manner that causes the amount of electric current induced in the first NFC component to satisfy the second threshold. The method may include performing, by the transaction card, an action related to completing a transaction in association with dynamically activating the one or more output components.

The method may include activating the one or more output components in a first manner based on the amount of electric current induced in the first NFC component, or activating the one or more output components in a second manner based on the amount of electric current induced in the first NFC component. The first manner and the second manner may be associated with different amounts of electric current. The method may include determining that the amount of electric current induced in the first NFC component satisfies the second threshold based on monitoring the amount of electric current induced in the first NFC component. The method may include performing the action after determining that the amount of electric current induced in the first NFC component satisfies the second threshold. The method may include providing, to the other device, information to complete the transaction after determining that the amount of electric current induced in the first NFC component satisfies the second threshold. The method may include dynamically modulating the output of the one or more output components based on monitoring the amount of electric current induced in the first NFC component. The method may include dynamically modifying the output of the one or more output components based on monitoring the amount of electric current induced in the first NFC component.

According to some possible implementations, a transaction card may include one or more output components configured to provide one or more sensory outputs; and a first near-field communication (NFC) component configured to detect an electric current induced in the first NFC component when the first NFC component is within an electromagnetic field generated by a second NFC component of another device. An amount of electric current induced in the first NFC component may be indicative of a strength of coupling between the first NFC component and the second NFC component. The first NFC component may be configured to trigger a first sensory output of the one or more sensory outputs of the one or more output components based on a first amount of electric current induced in the first NFC component. The first NFC component may be configured to trigger a second sensory output of the one or more sensory outputs of the one or more output components based on a second amount of electric current induced in the first NFC component. The first sensory output and the second sensory output may be different. The first sensory output and the second sensory output may be configured to indicate a change in the strength of coupling based on a change between the first amount of electric current and the second amount of electric current.

The first NFC component may be configured to trigger a third sensory output of the one or more sensory outputs of the one or more output components based on a third amount of electric current induced in the first NFC component. The third amount of electric current may satisfy a threshold to enable a data transfer between the first NFC component and the second NFC component. The third sensory output may be different than the first sensory output and the second sensory output. The first amount of electric current and the second amount of electric current may be less than a threshold for a data transfer between the first NFC component and the second NFC component. The first NFC component may be configured to provide data to the other device based on a third amount of electric current induced in the NFC component satisfying a threshold.

The third amount of electric current may be associated with a data transfer between the first NFC component and the second NFC component. The first NFC component may be configured to detect that the first amount of electric current or the second amount of electric current induced in the first NFC component satisfies a respective threshold associated with each of the first amount of electric current and the second amount of electric current. The first NFC component may be configured to trigger the first sensory output after detecting the first amount of electric current that satisfies the respective threshold, or trigger the second sensory output after detecting the second amount of electric current that satisfies the respective threshold. The first NFC component may be configured to trigger the second sensory output based on modulating the first sensory output from a first intensity to a second intensity. The first intensity and the second intensity may be different. The first NFC component may be configured to trigger the second sensory output based on modifying the first sensory output from a first type of sensory output to a second type of sensory output. The first type of sensory output and the second type of sensory output may be different.

According to some possible implementations, a transaction card may include a first near-field communication (NFC) component that includes one or more coils configured to communicatively couple the first NFC component and a second NFC component. The second NFC component may be associated with a transaction terminal. The transaction card may include one or more memories configured to store data to be provided to the second NFC component to complete a transaction. The one or more memories may be communicatively coupled to the one or more coils. The transaction card may include one or more processors, communicatively coupled to the one or more coils and the one or more memories, configured to detect an electric current induced in the one or more coils when the one or more coils are within an electromagnetic field generated by the second NFC component.

An amount of electric current induced in the one or more coils may be indicative of a strength of a connection between the first NFC component and the second NFC component for a data transfer. The one or more processors may be configured to trigger a first sensory output from one or more output components of the transaction card based on a first amount of electric current induced in the first NFC component. The one or more processors may be configured to trigger a second sensory output of the one or more output components based on a second amount of electric current induced in the first NFC component. The first sensory output and the second sensory output may be different. The first sensory output and the second sensory output may be associated with indicating a change in the strength of the connection between the first NFC component and the second NFC component. The one or more processors may be configured to provide, to the second NFC component and via the one or more coils, the data to complete the transaction based on a third amount of electric current induced in the one or more coils. The data may be provided from the one or more memories.

The third amount of electric current may be more than the first amount of electric current and the second amount of electric current. The one or more processors may be configured to trigger a third sensory output of the one or more output components based on a third amount of electric current induced in the one or more coils. The third sensory output may be associated with indicating that the first NFC component has provided the data to the second NFC component to complete the transaction. The third sensory output may be different than the first sensory output and the second sensory output. The one or more processors may be configured to trigger a third sensory output of the one or more output components based on a third amount of electric current induced in the one or more coils. The third amount of electric current may satisfy a threshold associated with completing the transaction. The third sensory output may be different than the first sensory output and the second sensory output.

The first amount of electric current and the second amount of electric current may be less than a threshold associated with completing the transaction. The one or more processors may be configured to modulate the first sensory output by increasing an intensity of the first sensory output to generate the second sensory output. The one or more processors may be configured to modify the first sensory output by changing the first sensory output from a first type of sensory output to a second type of sensory output to generate the second sensory output.

According to some possible implementations, a method may include detecting, by a transaction card, an electric current induced in a first NFC component of the transaction card when the first NFC component is within an electromagnetic field generated by a second NFC component of another device. An amount of electric current induced in the first NFC component may be indicative of a strength of a connection between the first NFC component and the second NFC component. The method may include determining, by the transaction card, whether the amount of electric current induced in the first NFC component satisfies a threshold of one or more thresholds. The method may include dynamically: triggering, by the transaction card, a first sensory output of one or more sensory outputs of one or more output components of the transaction card based on a first amount of electric current induced in the first NFC component, where the first sensory output is associated with a first strength of the connection between the transaction card and the other device, and the first amount of electric current satisfies a first threshold of the one or more thresholds, or triggering, by the transaction card, a second sensory output of the one or more sensory outputs of the one or more output components based on a second amount of electric current induced in the first NFC component.

The second sensory output may be different than the first sensory output. The second sensory output may be associated with a second strength of the connection between the transaction card and the other device. The first strength of the connection and the second strength of the connection may be different. The second amount of electric current may satisfy a second threshold, of the one or more thresholds, that is different than the first threshold.

The first sensory output may be associated with a first intensity of a sensory output, and the second sensory output may be associated with a second intensity of the sensory output. The first intensity and the second intensity may be different. The first sensory output may be associated with a first type of sensory output, and the second sensory output may be associated with a second type of sensory output. The first type of sensory output and the second type of sensory output may be different. The method may include detecting that the first NFC component is within the electromagnetic field prior to detecting the amount of electric current induced in the first NFC component.

The method may include triggering a third sensory output of the one or more sensory outputs of the one or more output components based on a third amount of electric current induced in the first NFC component. The third amount of electric current may be less than the first amount of electric current and the second amount of electric current. The third amount of electric current may satisfy a third threshold, of the one or more thresholds, that is different than the first threshold and the second threshold. The third sensory output may be associated with indicating that the first NFC component is within the electromagnetic field. The first sensory output may include one of light output of the one or more output components, a sound output of the one or more output components, or a vibration output of the one or more output components.

The second sensory output may include another of the light output, the sound output, or the vibration output. The method may include triggering a third sensory output of the one or more output components based on a third amount of electric current induced in the first NFC component. The third sensory output may be associated with indicating that the transaction card can provide data to the other device. The third amount of electric current may be more than the first amount of electric current and the second amount of electric current. The third sensory output may be different than the first sensory output or the second sensory output. The method may include providing the data to the other device to complete a transaction in association with triggering the third sensory output.

DETAILED DESCRIPTION

Figure 1:
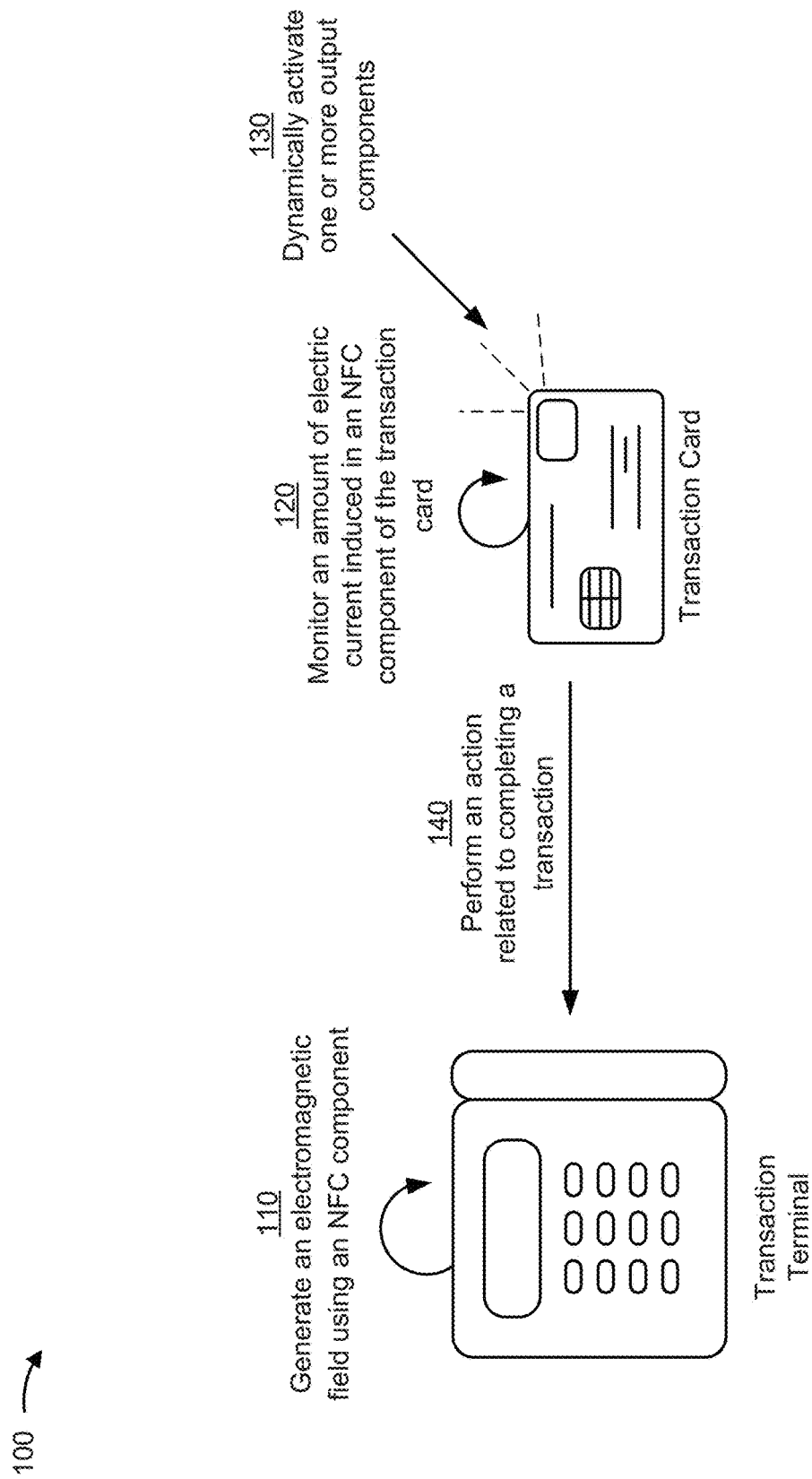
FIG. 1 is a diagram of an overview of an example implementation described herein.

The following detailed description of example implementations refers to the accompanying drawings. The same reference numbers in different drawings may identify the same or similar elements.

Near-field communication (NFC) may include the use of an air core transformer (e.g., where one coil of the air core transformer is in a transaction terminal (e.g., a powered device) and another coil of the air core transformer is in a transaction card (e.g., an unpowered device)). When using NFC to provide data, the transaction card may not be capable of providing data until a threshold amount of electric current has been induced in the coil associated with the transaction card. For NFC communications, the closeness of NFC devices alone may not be sufficient to enable communication. That is, the coils of the transaction terminal and the transaction card may also need to be oriented in a particular manner to permit a threshold amount of electric current to be induced in the coil of the transaction card. The amount of electric current induced in the coil of the transaction card may be indicative of a degree to which an NFC component of the transaction card and an NFC component of the transaction terminal are communicatively coupled. Unlike existing technologies, knowledge of antenna location between communicating devices also may not enable sufficient coupling. Due to this, a user of the transaction card may have to experiment with manipulating the orientation of the transaction card in relation to the transaction terminal to achieve a sufficient coupling to complete a transaction. Existing transaction cards do not help users to identify the proper orientation of the transaction card and the transaction terminal for communicating via NFC. Furthermore, each transaction terminal may be configured differently, such that an orientation of a transaction card at a first terminal that achieves sufficient coupling may not result in sufficient coupling when similarly oriented at a second terminal.

This trial and error or experimentation may consume significant time of the user of the transaction card and/or delay in providing the data from the transaction card to the transaction terminal, which may consume resources (e.g., processing resources, power resources, etc.) of the transaction card and/or the transaction terminal. Further, delay in providing the data from the transaction card to the transaction terminal may consume resources of the transaction card and/or the transaction terminal relative to more quickly establishing a connection between the transaction card and the transaction terminal and more quickly providing the data.

Some implementations, described herein, provide a transaction card that is capable of activating an output component associated with the transaction card based on an amount of electric current that has been induced in an NFC component of the transaction card. In this way, the transaction card may indicate, to a user of the transaction card, an amount of electric current induced in the NFC component of the transaction card and/or a degree to which the NFC component of the transaction card and an NFC component of another device (e.g., a transaction terminal) are properly oriented or communicatively coupled. This permits the user of the transaction card to more quickly and easily determine a proper orientation of the NFC component of the transaction card relative to the NFC component of the other device, thereby reducing an amount of time the user needs to complete a transaction and/or conserving resources of the transaction card and/or the other device that would otherwise be consumed due to a delay in completion of the transaction. In addition, by reducing an amount of time needed to properly orient NFC components, the transaction card and/or the other device may be capable of processing a higher quantity of transactions during an amount of time, thereby reducing the amount of power consumption of the transaction terminal and/or the transaction card on a per transaction basis.

FIG. 1 is a diagram of an overview of an example implementation 100 described herein. As shown in FIG. 1, implementation 100 includes a transaction terminal and a transaction card.

As shown in FIG. 1, and by reference number 110, the transaction terminal may generate an electromagnetic field using an NFC component associated with the transaction terminal (e.g., may be an active NFC component). For example, the NFC component may include a coil that is to form one coil of an air core transformer and may be powered.

As shown by reference number 120, the transaction card may monitor or detect an amount of electric current induced in an NFC component of the transaction card. For example, the transaction card may monitor an amount of electric current induced in the NFC component of the transaction card as the NFC component of the transaction card is within the electromagnetic field of the NFC component of the transaction terminal. The NFC component of the transaction card may include a coil that is to form another coil of the air core transformer associated with inducing electric current in the NFC component of the transaction card. When the NFC component of the transaction card is moved within the electromagnetic field generated by the NFC component of the transaction terminal, electric current may be induced in the NFC component of the transaction card and may be stored in a capacitor of the transaction card until a threshold is satisfied (e.g., prior to monitoring the amount of electric current induced in the NFC component of the transaction card). For example, the threshold may be associated with an amount of power needed to power one or more processors of the transaction card, to power on the transaction card for use, and/or the like). This conserves power resources of the transaction card by preventing the transaction card from powering on until needed.

As shown by reference number 130, the transaction card may dynamically activate one or more output components of the transaction card. For example, the one or more output components may include one or more light emitting elements, one or more speakers, a vibration motor, and/or the like.

The one or more output components may dynamically indicate an amount of power induced in the NFC component of the transaction card, a degree to which the NFC component of the transaction card and the NFC component of the transaction terminal are properly oriented (e.g., to cause a threshold amount of electric current to be induced in the NFC component of the transaction card), and/or the like. For example, the transaction card may activate different sets of lights, activate different patterns of lights, change a color of a set of lights, and/or the like based on the amount of electric current induced in the NFC component of the transaction card satisfying different thresholds.

In this way, a user of the transaction card can identify an orientation of an NFC component of the transaction card relative to an NFC component of the transaction terminal that causes a threshold amount of electric current to be induced in the NFC component of the transaction card (e.g., as the amount of electric current induced in the NFC component of the transaction card changes as the user of the transaction card moves and orients the transaction card through the electromagnetic field generated by the NFC component of the transaction terminal). This permits the user of the transaction card to determine an orientation of the transaction card that results in a threshold amount of electric current being induced in the NFC component of the transaction card, thereby reducing an amount of time needed to properly orient the NFC component of the transaction card relative to the NFC component of the transaction terminal.

As shown by reference number 140, the transaction card may perform an action related to completing a transaction. For example, the transaction card may provide, via the NFC component of the transaction card, data to the transaction terminal to complete the transaction, such as data related to an account, the transaction card, and/or the like. If the transaction card includes a processor, the processor of the transaction card may cause the data to be provided to the transaction terminal via the NFC component (e.g., automatically, based on input from a user of the user device when the user device is connected to the transaction card, etc.). Conversely, if the transaction card does not include a processor, the transaction card may automatically provide data from a memory resource, and to the transaction terminal via the NFC component, when a threshold amount of electric current has been induced in the NFC component.

Additionally, or alternatively, the transaction card may activate the one or more output components to indicate that data was provided to the transaction terminal. For example, output from the one or more output components that is used to indicate that data has been provided to the transaction terminal may be different than output used to indicate an amount of electric current induced in the NFC component of the transaction card and/or a degree to which the NFC component of the transaction card and the NFC component of the transaction terminal are properly oriented. This conserves power resources of the transaction card and/or the transaction terminal by reducing an amount of time that the transaction card and/or the transaction terminal need to communicate until a transaction is complete (e.g., by facilitating removal of the transaction card from communication with the transaction terminal quicker than if the user of the transaction card does not know when the transaction is complete).

In this way, a transaction card may dynamically indicate an amount of electric current induced in an NFC component of the transaction card. This permits the transaction card to facilitate proper orientation of the NFC component of the transaction card relative to an NFC component of a transaction terminal, thereby reducing an amount of time needed for a user of the transaction card to properly orient the NFC component of the transaction card relative to the NFC component of the transaction terminal. In addition, this conserves resources (e.g., processing resources and/or power resources) of the transaction card and/or the transaction terminal that would otherwise be consumed in association with a failed transaction (e.g., due to a failure of the NFC component of the transaction card and the NFC component of the transaction terminal to be properly oriented). Further, this permits a transaction to be completed faster by facilitating faster orientation of the NFC component of the transaction card relative to the NFC component of the transaction terminal, thereby increasing an efficiency of completing a transaction.

As indicated above, FIG. 1 is provided merely as an example. Other examples are possible and may differ from what was described with regard to FIG. 1.

Figure 2:
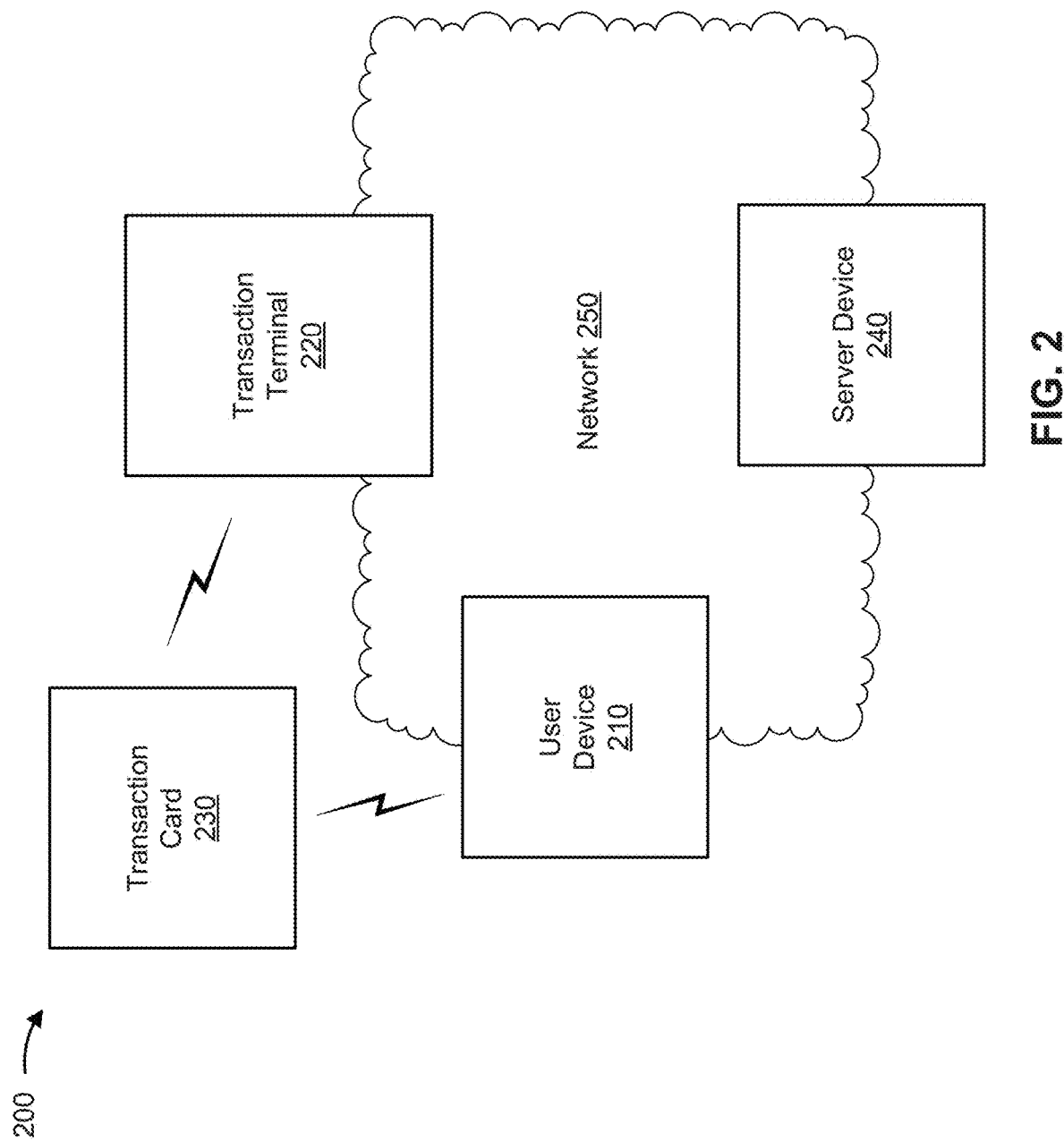
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a transaction terminal 220, a transaction card 230, a server device 240, and a network 250. Devices of environment 200 may interconnect via wired connections, wireless connections, or a combination of wired and wireless connections.

User device 210 includes one or more devices capable of receiving, generating, storing, processing, and/or providing information associated with properly orienting an NFC component of transaction card 230 relative to an NFC component of transaction terminal 220. For example, user device 210 may include a desktop computer, a mobile phone (e.g., a smart phone, a radiotelephone, etc.), a laptop computer, a tablet computer, a handheld computer, a gaming device, a virtual reality device, a wearable communication device (e.g., a smart wristwatch, a pair of smart eyeglasses, etc.), or a similar type of device. In some implementations, user device 210 may provide, to server device 240, information identifying transaction card 230 and/or transaction terminal 220, as described elsewhere herein. Additionally, or alternatively, user device 210 may receive, from server device 240, a set of instructions related to orienting an NFC component of transaction card 230 relative to transaction terminal 220, as described elsewhere herein. In some implementations, user device 210 may execute an application that facilitates properly orienting transaction card 230 relative to transaction terminal 220.

Transaction terminal 220 includes one or more devices capable of facilitating processing of a transaction associated with transaction card 230. For example, transaction terminal 220 may include a PoS terminal, a payment terminal (e.g., a credit card terminal, a contactless payment terminal, a mobile credit card reader, a chip reader, etc.), a security access terminal, an automated teller machine (ATM) terminal, and/or the like. In some implementations, transaction terminal 220 may generate an electromagnetic field via an NFC component associated with transaction terminal 220, as described elsewhere herein. Additionally, or alternatively, transaction terminal 220 may receive, from transaction card 230, data (e.g., via an NFC connection), as described elsewhere herein.

In some implementations, transaction terminal 220 may include one or more input components and/or output components to facilitate obtaining information from transaction card 230 (e.g., an account number of an account associated with transaction card 230, an expiration date of transaction card 230, etc.), input (e.g., a PIN, a signature, biometric information, etc.), from a cardholder of transaction card 230, related to completing and/or authorizing a transaction, and/or the like. In some implementations, example input components of transaction terminal 220 may include a number keypad, a touchscreen, a magnetic strip reader, a chip reader, a pen and corresponding signature pad, a radio frequency (RF) signal reader, an NFC component, and/or the like.

In some implementations, an NFC component of transaction terminal 220 may receive data from transaction card 230 as an NFC component of transaction card 230 is moved within communicative proximity of the NFC component of transaction terminal 220 and/or properly oriented relative to the NFC component of transaction terminal 220. In some implementations, a magnetic strip reader of transaction terminal 220 may receive data from transaction card 230 as a magnetic strip of transaction card 230 is swiped along the magnetic strip reader. In some implementations, a chip reader of transaction terminal 220 may receive data from transaction card 230 via an integrated circuit chip (e.g., an EMV chip) of transaction card 230 when the chip is placed within communicative proximity of the chip reader. In some implementations, an RF signal reader of transaction terminal 220 may enable a contactless transaction from transaction card 230 by obtaining data wirelessly from transaction card 230 as transaction card 230 comes within communicative proximity of transaction terminal 220, such that the RF signal reader detects an RF signal from an RF antenna of transaction card 230.

In some implementations, example output components of transaction terminal 220 may include a display, a speaker, a printer, a light, and/or the like. In some implementations, transaction terminal 220 may use an output component to output information related to a transaction (e.g., an indication to cause a user to input information to authorize a transaction, information that identifies whether a transaction was completed, etc.).

Transaction card 230 includes a transaction card that can be used to complete a transaction. For example, transaction card 230 may include a credit card, a debit card, a gift card, a payment card, an ATM card, a stored-value card, a fleet card, a transit card, an access card, a virtual card implemented on user device 210, and/or the like. Additionally, or alternatively, transaction card 230 may include a fob, a tag, and/or the like. Transaction card 230 may be capable of storing and/or communicating data for a point-of-sale (PoS) transaction with transaction terminal 220. For example, transaction card 230 may store and/or communicate data, including account information (e.g., an account identifier, a cardholder identifier, etc.), expiration information of transaction card 230 (e.g., information identifying an expiration month and/or year of transaction card 230), banking information (e.g., a routing number of a bank, a bank identifier, etc.), transaction information (e.g., a payment token), and/or the like. For example, to store and/or communicate the data, transaction card 230 may include an NFC component, a magnetic strip, and/or an integrated circuit (IC) chip (e.g., a EUROPAY®, MASTERCARD®, VISA® (EMV) chip). In some implementations, transaction card 230 may activate one or more output components of transaction card 230 to indicate an amount of electric current induced in an NFC component of transaction card 230, as described elsewhere herein. Additionally, or alternatively, transaction card 230 may provide, to transaction terminal 220, data related to completing a transaction (e.g., after an amount of current that satisfies a threshold has been induced in the NFC component of transaction card 230), as described elsewhere herein.

Transaction card 230 may include an antenna to communicate data associated with transaction card 230. The antenna may be a passive radio frequency (RF) antenna, an active RF antenna, and/or a battery-assisted RF antenna. In some implementations, transaction card 230 may be a smart transaction card, capable of communicating wirelessly (e.g., via Bluetooth, Bluetooth Low Energy (BLE), NFC, and/or the like) with a computing device, such as user device 210, transaction terminal 220, a digital wallet, and/or another device. In some implementations, transaction card 230 may communicate with transaction terminal 220 to complete a transaction (e.g., based on being moved within communicative proximity of transaction terminal 220), as described elsewhere herein.

Server device 240 includes one or more devices capable of receiving, providing, storing, processing, and/or generating information associated with orienting an NFC component of transaction card 230 relative to an NFC component of transaction terminal 220. For example, server device 240 may include a server (e.g., in a data center or a cloud computing environment), a data center (e.g., a multi-server micro data center), a workstation computer, a virtual machine (VM) provided in a cloud computing environment, or a similar type of device. In some implementations, server device 240 may include a communication interface that allows server device 240 to receive information from and/or transmit information to other devices in environment 200. In some implementations, server device 240 may receive information from user device 210, as described elsewhere herein. Additionally, or alternatively, server device 240 may provide, to user device 210, information for display that indicates an orientation of an NFC component of transaction card 230 relative to an NFC component of transaction terminal 220, as described elsewhere herein.

Network 250 includes one or more wired and/or wireless networks. For example, network 250 may include a cellular network (e.g., a long-term evolution (LTE) network, a code division multiple access (CDMA) network, a 3G network, a 4G network, a 5G network, another type of cellular network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
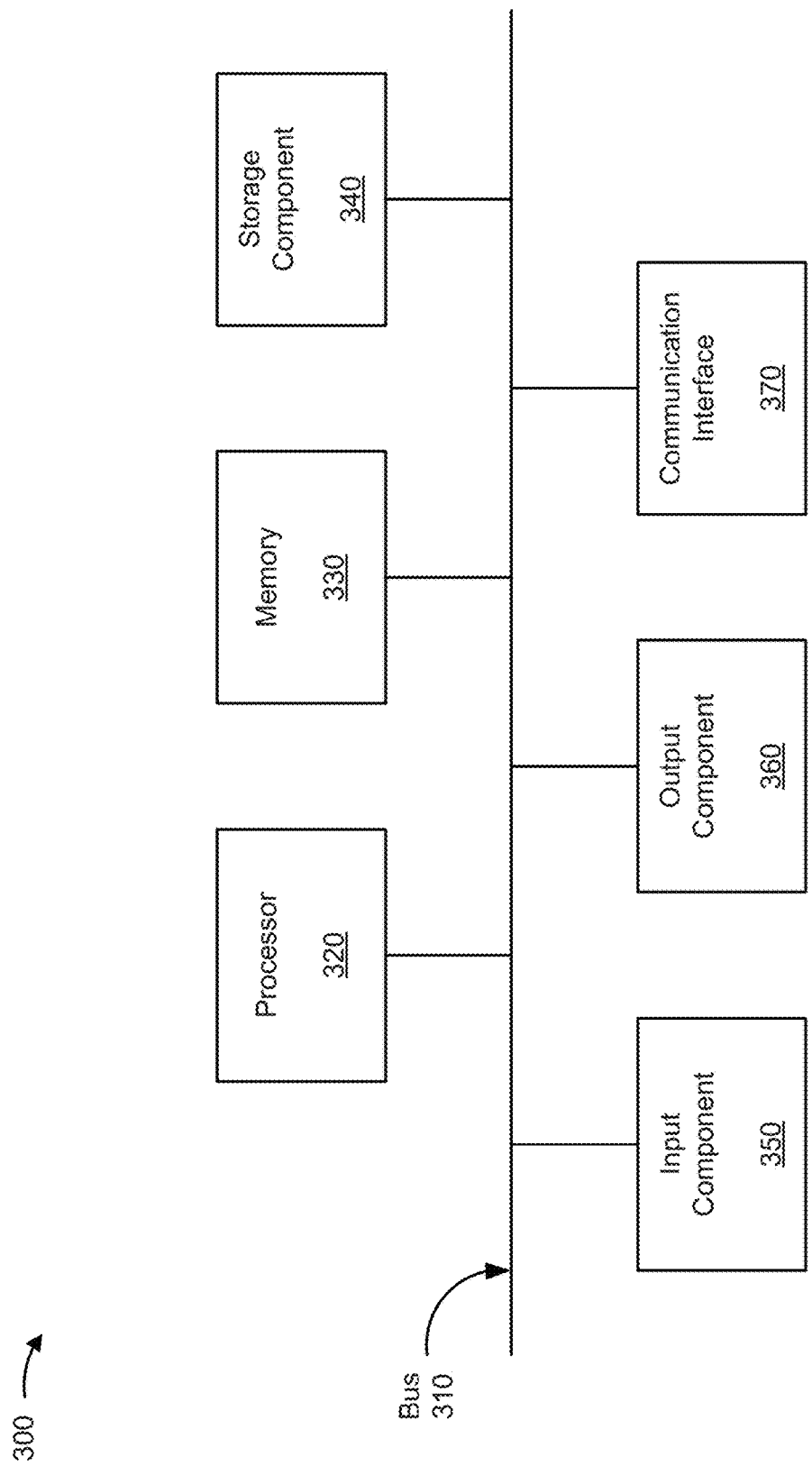
FIG. 3 is a diagram of example components of one or more devices of FIG. 2.

FIG. 3 is a diagram of example components of a device 300. Device 300 may correspond to user device 210, transaction terminal 220, transaction card 230, and/or server device 240. In some implementations, user device 210, transaction terminal 220, transaction card 230, and/or server device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
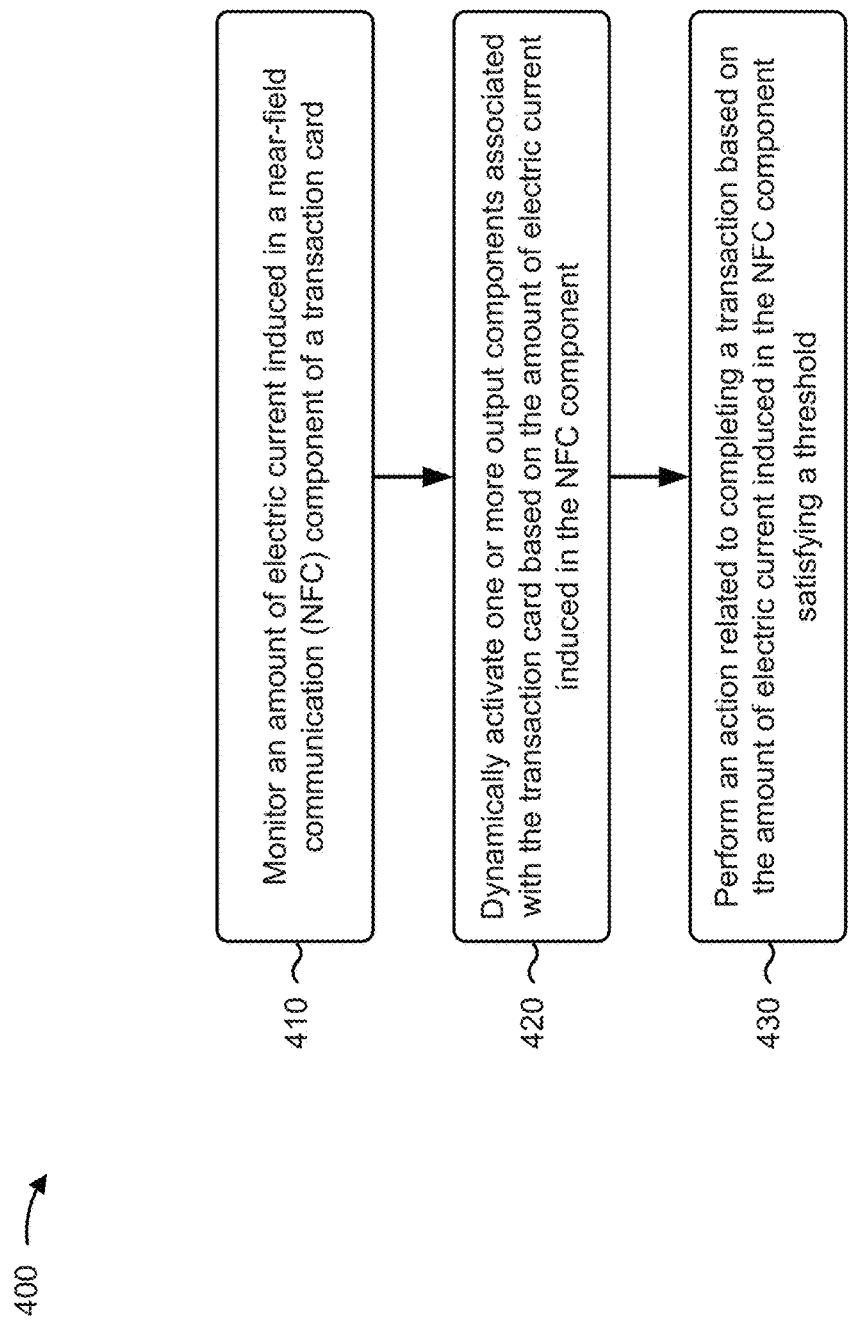
FIG. 4 is a flow chart of an example process for activating an output component to indicate an orientation of a near-field communication (NFC)-capable transaction card.

FIG. 4 is a flow chart of an example process 400 for activating an output component to indicate an orientation of a near-field communication (NFC)-capable transaction card. In some implementations, one or more process blocks of FIG. 4 may be performed by transaction card 230. In some implementations, one or more process blocks of FIG. 4 may be performed by another device or a group of devices separate from or including transaction card 230, such as user device 210, transaction terminal 220, and server device 240.

As shown in FIG. 4, process 400 may include monitoring an amount of electric current induced in a near-field communication (NFC) component of a transaction card (block 410). For example, transaction card 230 may monitor an amount of electric current induced in an NFC component of transaction card 230. In some implementations, transaction card 230 may monitor an amount of electric current induced in an NFC component associated with transaction card 230 to determine whether the amount of electric current satisfies a threshold (e.g., a threshold associated with providing data to transaction terminal 220).

In some implementations, an NFC component of transaction card 230 may include a coil (e.g., to be used to form an air core transformer with another coil of an NFC component of transaction terminal 220). Additionally, or alternatively, an NFC component of transaction card 230 may include an NFC antenna. For example, an NFC antenna may be associated with providing data from transaction card 230 to transaction terminal 220. Additionally, or alternatively, an NFC component may include circuitry to connect components of the NFC component and/or transaction card 230 (e.g., an NFC antenna, a coil, a processor, etc.). In some implementations, an NFC component may include circuitry configured or configurable to perform one or more operations for monitoring, detecting, or determining an induced electric current and activating or triggering one or more output components as described herein.

In some implementations, an NFC component of transaction card 230 may be a passive NFC component. For example, an NFC component of transaction card 230 may be unpowered, may not generate an electromagnetic field, may have electric current induced in the NFC component (e.g., when the NFC component of transaction card 230 is within an electromagnetic field generated by an NFC component of transaction terminal 220), and/or the like.

In some implementations, transaction card 230 may detect an amount of electric current induced in an NFC component of transaction card 230. For example, the amount of electric current induced in the NFC component of transaction card 230 may be indicative of a strength of a communication field between the NFC component of transaction card 230 and an NFC component of transaction terminal 220, a strength of a coupling between the NFC component of transaction card 230 and an NFC component of transaction terminal 220, a quality of a connection between the NFC component of transaction card 230 and the NFC component of transaction terminal 220 for a data transfer, whether transaction card 230 can provide data to transaction terminal 220, and/or the like. In some implementations, transaction card 230 may detect that an NFC component of transaction card 230 is within an electromagnetic field of transaction terminal 220 (e.g., based on electric current being induced in the NFC component of transaction card 230).

In some implementations, transaction card 230 may monitor an amount of electric current induced in an NFC component of transaction card 230 after powering on transaction card 230. For example, transaction card 230 may power on transaction card 230 when an amount of electric current induced in the NFC component of transaction card 230 satisfies a threshold (e.g., a threshold associated with powering on transaction card 230). In some implementations, powering on transaction card 230 may include supplying power to a processor of transaction card 230 and/or one or more other components of transaction card 230.

In some implementations, transaction card 230 may store electric current in a capacitor associated with transaction card 230. For example, as electric current is induced in an NFC component of transaction card 230, transaction card 230 may store electric current in a capacitor until an amount of current stored in the capacitor satisfies a threshold (e.g., a threshold associated with powering on transaction card 230) and may power on transaction card 230 using electric current stored in the capacitor.

In this way, transaction card 230 may monitor an amount of electric current induced in the NFC component of transaction card 230.

As further shown in FIG. 4, process 400 may include dynamically activating one or more output components associated with the transaction card based on the amount of electric current induced in the NFC component (block 420). For example, transaction card 230 may dynamically activate one or more output components associated with the transaction card based on the amount of electric current induced in the NFC component (e.g., based on monitoring the amount of electric current induced in the NFC component). In some implementations, activating an output component may include providing power to an output component to cause the output component to provide output (e.g., triggering sensory output), such as light output, sound output, vibration output, and/or the like. In some implementations, an output component may include a light emitting element, a speaker, a vibration motor, a screen, and/or the like. In some implementations, transaction card 230 may activate an output component based on determining whether an amount of electric current induced in an NFC component of transaction card 230 satisfies a threshold.

In some implementations, an output component may indicate whether an orientation of transaction card 230 relative to transaction terminal 220 has caused an amount of electric current induced in an NFC component of transaction card 230 to satisfy a threshold (e.g., a threshold associated with powering on transaction card 230, associated with providing data to transaction terminal 220, etc.), a quality of a connection between the NFC component of transaction card 230 and the NFC component of transaction terminal 220, and/or the like. Additionally, or alternatively, an output component may indicate whether an NFC component of transaction card 230 is properly oriented relative to an NFC component of transaction terminal 220 (e.g., whether transaction card 230 is oriented relative to transaction terminal 220 in a manner that causes an amount of electric current induced in an NFC component associated with transaction card 230 to satisfy a threshold), whether transaction terminal 220 can communicate with transaction terminal 220, whether an NFC component of transaction card 230 is within an electromagnetic field generated by transaction terminal 220, and/or the like.

In some implementations, when dynamically activating one or more output components of transaction card 230, transaction card 230 may activate a first output component, of the one or more output components, based on an amount of electric current induced in an NFC component of transaction card 230 satisfying a first threshold, and may activate a second output component, of the one or more output components, based on the amount of electric current induced in the NFC component satisfying a second threshold. For example, the first output component and the second output component may be different, may have different outputs, and/or the like. Continuing with the previous example, the first output component may be a light and the second output component may be a speaker, or the first output component may be a light of a first color and the second output component may be a light of a second color.

In some implementations, transaction card 230 may trigger a first sensory output based on a first amount of electric current induced in an NFC component of transaction card 230 and may trigger a second sensory output based on a second amount of electric current induced in the NFC component of transaction card 230 (e.g., where the first sensory output is different from the second sensory output, the first amount of electric current is different than the second amount of electric current, etc.). For example, the first sensory output and the second sensory output may have different intensities, may have different on/off patterns, may be different types of sensory outputs (e.g., a light output, a sound output, a vibration output, etc.), may indicate different degrees of coupling between the NFC component of transaction card 230 and an NFC component of transaction terminal 220 (e.g., based on a change between the first and second amounts of electric current), and/or the like.

In some implementations, transaction card 230 may trigger a third sensory output to indicate that a third amount of electric current induced in an NFC component of transaction card 230 satisfies a threshold for a data transfer between transaction terminal 220 and transaction card 230 (e.g., to complete a transaction), that transaction card 230 has provided data to transaction terminal 220 (e.g., has completed a transaction), and/or the like. For example, the third sensory output may be different than the first sensory output and the second sensory output previously described and the third amount of electric current may be different than the first amount of electric current and the second amount of electric current previously described.

In some implementations, transaction card 230 may modulate output of an output component based on an amount of electric current induced in an NFC component of transaction card 230. For example, transaction card 230 may increase or decrease an intensity of an output of an output component. In some implementations, modulating output may include modulating a brightness of light output by a light associated with transaction card 230, an intensity of a vibration of a vibration motor associated with transaction card 230, a volume or loudness of a sound output by a speaker associated with transaction card 230, and/or the like.

In some implementations, transaction card 230 may modulate a first sensory output to generate a second sensory output. For example, transaction card 230 may modulate an intensity (e.g., a brightness, a loudness, etc.) of a first sensory output to generate a second sensory output. In some implementations, a first sensory output and a second sensory output may have different intensities. For example, the first sensory output may have a first intensity (e.g., a first brightness) and the second sensory output may have a second intensity (e.g., a second brightness).

Additionally, or alternatively, transaction card 230 may modify output of an output component based on an amount of electric current induced in an NFC component of transaction card 230. For example, transaction card 230 may modify output from a first output to a second output (e.g., where the first output is different than the second output). In some implementations, modifying an output of an output component may include modifying a color of light output by a light associated with transaction card 230, a pattern of a vibration output by a vibration motor associated with transaction card 230, a sound output by a speaker associated with transaction card 230, and/or the like.

In some implementations, transaction card 230 may modify a first sensory output to a second sensory output (e.g., by modifying the first sensory output from a first type of sensory output to a second type of sensory output). For example, transaction card 230 may modify a first sensory output from a light output to a vibration output (e.g., by stopping the light output and starting the vibration output).

In this way, transaction card 230 may dynamically activate one or more output components associated with transaction card 230 based on the amount of electric current induced in the NFC component.

As further shown in FIG. 4, process 400 may include performing an action related to completing a transaction based on the amount of electric current induced in the NFC component satisfying a threshold (block 430). For example, transaction card 230 may perform an action related to completing a transaction based on the amount of electric current induced in the NFC component of transaction card 230 satisfying a threshold (e.g., in association with dynamically activating an output component).

In some implementations, satisfying a threshold amount of electric current may indicate that transaction card 230 can communicate with transaction terminal 220 (e.g., that transaction card 230 can provide data to transaction terminal 220, can complete a transaction, can complete a data transfer, etc.). In some implementations, a threshold amount of electric current needed to provide data to transaction terminal 220 may be more than an amount of electric current that causes transaction card 230 to activate an output component.

In some implementations, transaction card 230 may provide, to transaction terminal 220, information related to an account associated with transaction card 230 (e.g., to complete a transaction, via a coil of an NFC component of transaction card 230, etc.). For example, information related to an account may identify an account, an individual associated with an account, a type of an account (e.g., a checking account, a savings account, a business account, etc.), a personal identification number or password associated with an account, and/or the like.

In some implementations, transaction card 230 may request, via an output component, confirmation to complete a transaction (e.g., after determining that the amount of electric current induced in an NFC component of transaction card 230 satisfies a threshold). For example, confirmation from a user of transaction card 230 may include input via an input component of transaction card 230 and/or user device 210 (e.g., when user device 210 is connected to transaction card 230 and/or transaction terminal 220), maintaining an orientation of transaction card 230 that causes an amount of electric current induced in an NFC component of transaction card 230 to satisfy a threshold for a threshold amount of time, and/or the like.

In some implementations, transaction card 230 may determine that an amount of electric current induced in an NFC component of transaction card 230 satisfies a threshold and/or that the amount of electric current satisfies the threshold for a threshold amount of time. For example, transaction card 230 may monitor an amount of electric current induced in an NFC component of transaction card 230 and may determine that the amount of electric current induced in the NFC component satisfies a threshold and/or satisfies the threshold for a threshold amount of time based on monitoring the amount of electric current induced. In some implementations, transaction card 230 may perform an action after determining that an amount of electric current induced in an NFC component of transaction card 230 satisfies a threshold (e.g., a threshold that permits transaction card 230 to complete a transaction, to provide data to transaction terminal 220, etc.) and/or satisfies the threshold for a threshold amount of time (e.g., indicating that a user of transaction card 230 wants to complete a transaction).

In some implementations, transaction card 230 may activate an output component of transaction card 230 (e.g., to indicate that data was provided to transaction terminal 220, that a transaction was completed, etc.). Additionally, or alternatively, transaction card 230 may provide, to user device 210 for display, information to indicate that data was provided to transaction terminal 220, that a transaction was completed, and/or the like.

In some implementations, transaction card 230 may determine whether a possible error related to transaction card 230 and/or transaction terminal 220 is present (e.g., based on monitoring an amount of electric current induced in an NFC component of transaction card 230). For example, transaction card 230 may determine that a possible error is present based on detecting that a threshold amount of electric current has been induced in an NFC component of transaction card 230 without providing data to transaction terminal 220, that a threshold amount of electric current has been induced in an NFC component of transaction card 230 for a threshold amount of time without providing data to transaction terminal 220, that a threshold amount of electric current has not been induced in the NFC component of transaction card 230 within a threshold amount of time of electric current being induced, and/or the like.

In this way, transaction card 230 may perform an action related to completing a transaction based on the amount of electric current induced in the NFC component of transaction card 230 satisfying a threshold.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. Furthermore, although process 400 and other examples throughout this disclosure are described with respect to a transaction card 230, in some implementations, operations of process 400 (as well as implementation 500 and other examples) may be performed by user device 210 configured for communicating via NFC.

Figure 5:
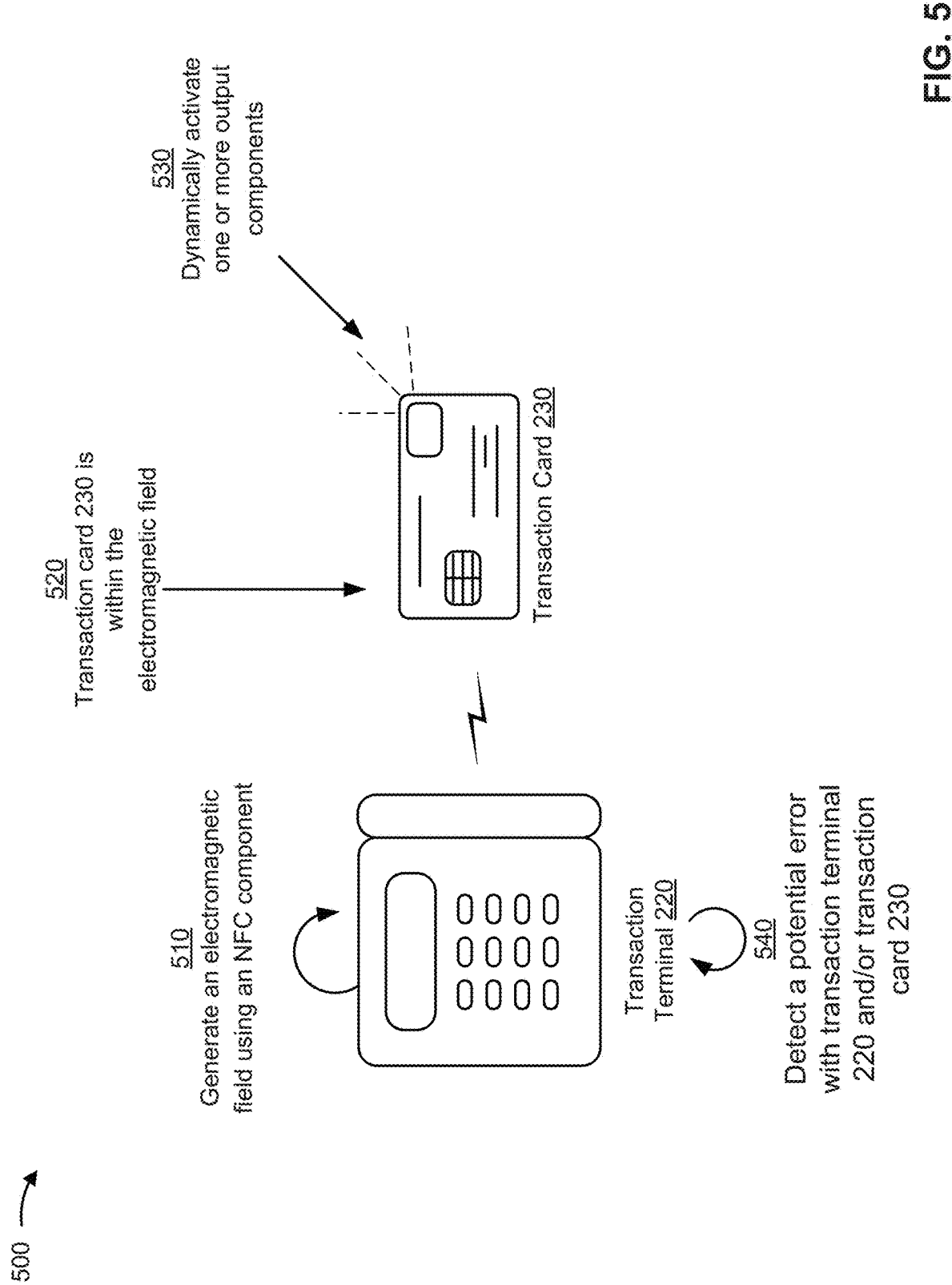
FIG. 5 is a diagram of an example implementation relating to the example process shown in FIG. 4.

FIG. 5 is a diagram of an example implementation 500 related to process 400 shown in FIG. 4. FIG. 5 shows an example of transaction terminal 220 detecting a potential error associated with transaction terminal 220 and/or transaction card 230.

As shown in FIG. 5, and by reference number 510, transaction terminal 220 may generate an electromagnetic field using an NFC component of transaction terminal 220. In some implementations, an NFC component of transaction terminal 220 may be an active NFC component. For example, an NFC component of transaction terminal 220 may be powered (e.g., to cause the NFC component to generate an electromagnetic field). In some implementations, an NFC component may be selectively powered (e.g., to conserve resources, such as power resources), such as based on user input, based on detecting a presence of transaction card 230 (other than via detection of an NFC connection), based on input from a user of user device 210 associated with transaction card 230, based on transaction terminal 220 being activated for a transaction (e.g., when transaction terminal 220 is used to scan an article, receives input related to an article, etc.), and/or the like. In some implementations, an NFC component of transaction terminal 220 may include a coil (e.g., a coil that is to form an air core transformer with a coil of transaction card 230), an NFC antenna (e.g., to communicate with transaction card 230 via an NFC connection), and/or the like.

As shown by reference number 520, assume for FIG. 5, that transaction card 230 is within the electromagnetic field generated by transaction terminal 220. For example, a user of transaction card 230 may move transaction card 230 (or an NFC component of transaction card 230) within a threshold distance of transaction terminal 220 (or an NFC component of transaction terminal 220) to bring an NFC component of transaction card 230 within an electromagnetic field generated by transaction terminal 220. As shown by reference number 530, transaction card 230 may dynamically activate one or more output components in a manner similar to that described elsewhere herein. For example, transaction card 230 may dynamically activate one or more output components as an amount of electric current induced in an NFC component of transaction card 230 changes based on an orientation of the NFC component of transaction card 230 relative to an NFC component of transaction terminal 220.

As shown by reference number 540, transaction terminal 220 may detect a potential error with transaction terminal 220 and/or transaction card 230. For example, transaction terminal 220 may detect that transaction card 230 has been within an electromagnetic field of transaction terminal 220 for a threshold amount of time (e.g., based on detecting that transaction card 230 is drawing electric current from an electromagnetic field of transaction terminal 220) without receiving data from transaction card 230 (e.g., indicating that a threshold amount of electric current has not been induced in an NFC component of transaction card 230 for a threshold amount of time, that transaction card 230 cannot provide data to transaction terminal 220, etc.).

In some implementations, transaction terminal 220 may perform an action based on detecting a potential error. For example, transaction terminal 220 may provide, for display, information identifying detection of a potential error (e.g., via a display of transaction terminal 220). Additionally, or alternatively, transaction terminal 220 may provide information identifying detection of a potential error to server device 240 (e.g., to cause server device 240 to notify user device 210 of the potential error, to cause server device 240 to provide information to user device 210 for display that identifies the potential error, etc.).

As indicated above, FIG. 5 is provided merely as an example. Other examples are possible and may differ from what was described with regard to FIG. 5.

Figure 6:
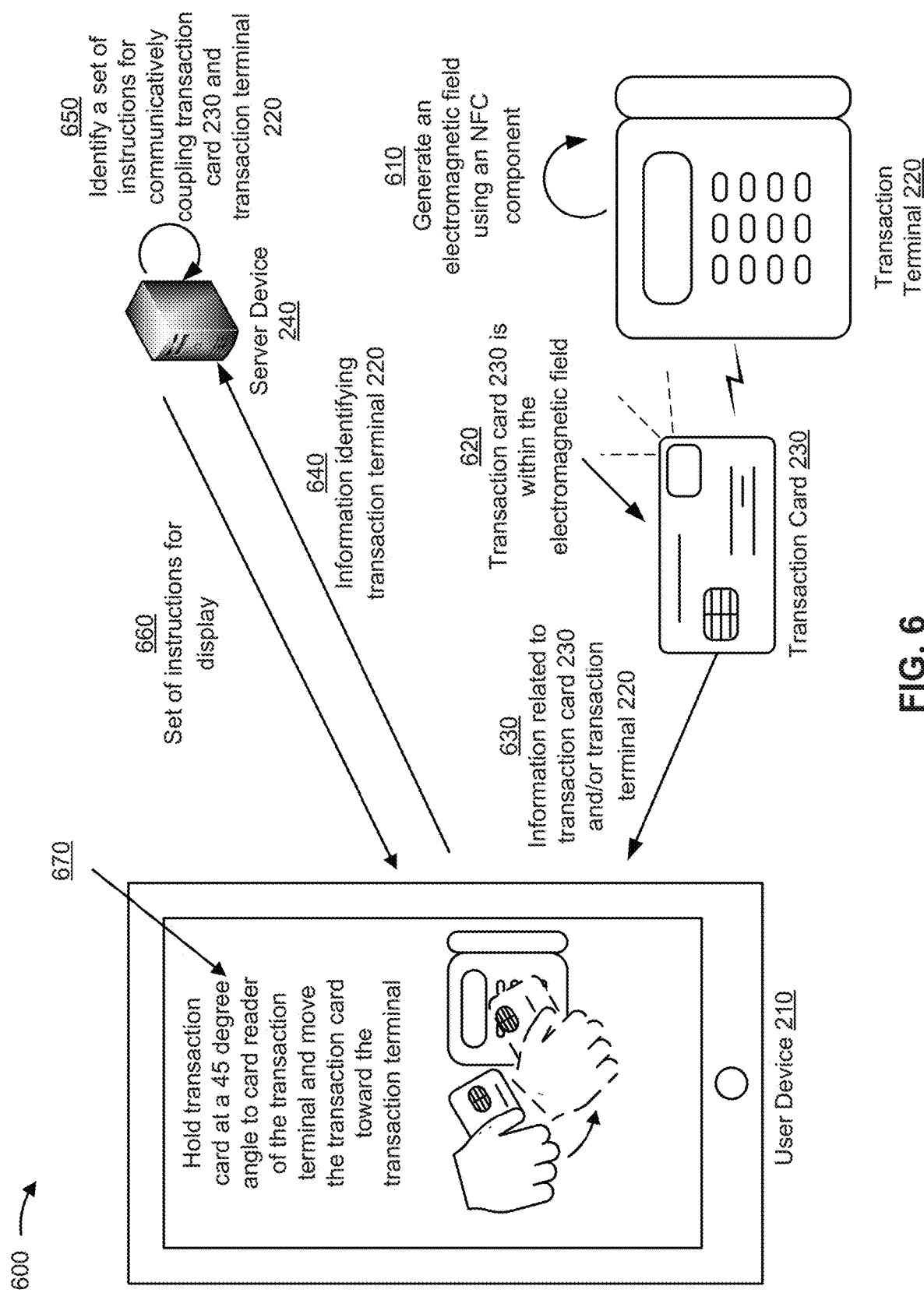
FIG. 6 is a diagram of an example implementation relating to the example process shown in FIG. 4.

FIG. 6 is a diagram of an example implementation 600, related to process 400 shown in FIG. 4. FIG. 6 shows an example of providing a set of instructions related to properly orienting an NFC component of transaction card 230 relative to an NFC component of transaction terminal 220.

As shown in FIG. 6, and by reference number 610, transaction terminal 220 may generate an electromagnetic field using an NFC component of transaction terminal 220, in a manner similar to that described elsewhere herein. As shown by reference number 620, assume for FIG. 6 that transaction card 230 is within the electromagnetic field generated by transaction terminal 220.

As shown by reference number 630, transaction card 230 may provide, to user device 210, information related to transaction card 230 and/or transaction terminal 220. For example, the information may identify transaction card 230 and/or transaction terminal 220, an amount of electric current induced in an NFC component of transaction card 230 at various times when the NFC component of transaction card 230 was within the electromagnetic field, an amount of time that the NFC component of transaction card 230 was within the electromagnetic field without providing data to transaction terminal 220, whether an amount of electric current induced in the NFC component of transaction card 230 satisfied a threshold and/or satisfied the threshold for a threshold amount of time, and/or the like.

In some implementations, transaction card 230 may provide information to user device 210 after detecting a potential error with transaction terminal 220 and/or transaction card 230. Additionally, or alternatively, transaction card 230 may provide the information after receiving a request from user device 210 to provide the information (e.g., based on user device 210 detecting a potential error with transaction terminal 220 and/or transaction card 230, based on user device 210 receiving information from server device 240 that indicates a potential error with transaction card 230 and/or transaction terminal 220, etc.).

As shown by reference number 640, user device 210 may provide information identifying transaction terminal 220 to server device 240. As shown by reference number 650, server device 240 may identify a set of instructions for communicatively coupling transaction card 230 and transaction terminal 220. For example, a set of instructions may identify a manner in which transaction card 230 needs to be oriented relative to transaction terminal 220 to properly orient an NFC component of transaction card 230 and an NFC component of transaction card 230.

As shown by reference number 660, server device 240 may provide, to user device 210, the set of instructions for display. As shown by reference number 670, user device 210 may provide the set of instructions for display via a display of user device 210. For example, user device 210 may provide an animated output to show a user of transaction card 230 how to properly hold transaction card 230 relative to transaction terminal 220. As another example, user device 210 may provide an augmented reality output that overlays a visual guide for assisting the user as to how to properly hold transaction card 230 relative to transaction terminal 220. As yet another example, user device 210 may provide a virtual reality output that provides a visual guide for assisting the user as to how to properly hold a virtual representation of transaction card 230 relative to a virtual representation transaction terminal 220.

As indicated above, FIG. 6 is provided merely as an example. Other examples are possible and may differ from what was described with regard to FIG. 6.

Figure 7A:
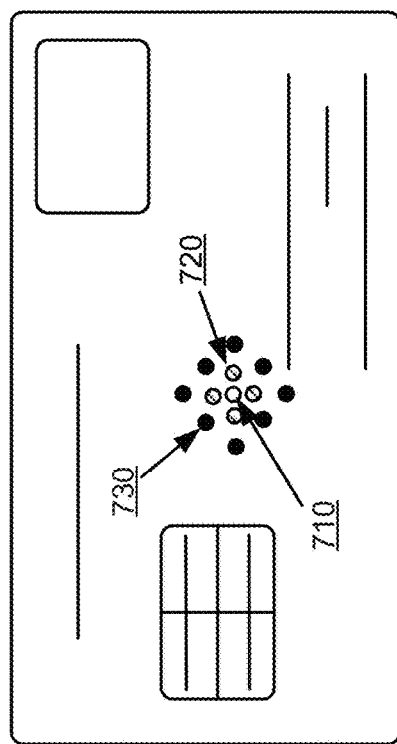
FIGS. 7A and 7B are diagrams of example implementations relating to the example process shown in FIG. 4.
Figure 7B:
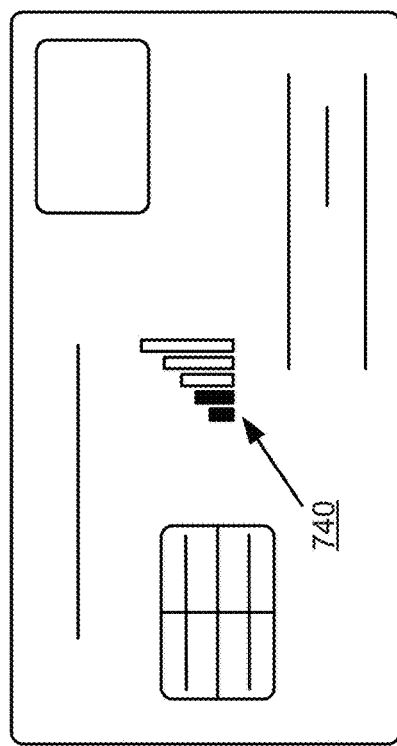

FIGS. 7A and 7B are diagrams of an example implementation 700 relating to example process 400 shown in FIG. 4. FIGS. 7A and 7B show examples of output components of transaction card 230 that may be used to indicate an amount of electric current induced in an NFC component of transaction card 230, a strength of a connection between transaction card 230 and transaction terminal 220, and/or the like.

As shown in FIG. 7A, and by reference number 710, transaction card 230 may activate a first set of output components (e.g., a first set of light emitting elements, shown by the white circle) to indicate that a first amount of electric current has been induced in an NFC component of transaction card 230. For example, the first set of output components may indicate that transaction card 230 is within an electromagnetic field generated by transaction terminal 220.

As shown by reference number 720, transaction card 230 may activate a second set of output components (e.g., shown by the striped pattern circles) to indicate that a second amount of electric current has been induced in the NFC component of transaction card 230 (e.g., based on a different orientation of the NFC component of transaction card 230 and an NFC component of transaction terminal 220). As shown by reference number 730, transaction card 230 may activate a third set of output components (e.g., a third set of light emitting elements, shown by black circles) to indicate that a third amount of electric current has been induced in the NFC component of transaction card 230. For example, the third set of output components may indicate that transaction card 230 can complete a transaction based on the amount of electric current induced in the NFC component of transaction card 230.

As shown in FIG. 7B, and by reference number 740, transaction card 230 may activate a set of output components (e.g., a set of light emitting components, shown as bars of various heights) to indicate an amount of electric current induced in an NFC component of transaction card 230. For example, transaction card 230 may activate the first and second output components to illuminate the first bar and the second bar to indicate an amount of electric current induced in an NFC component of transaction card 230 (e.g., shown as the black bars).

As indicated above, FIGS. 7A and 7B are provided merely as an example. Other examples are possible and may differ from what was described with regard to FIGS. 7A and 7B.

In this way, transaction card 230 may dynamically activate one or more output components based on an amount of electric current induced in an NFC component of transaction card 230. This permits transaction card 230 to dynamically indicate an amount of electric current induced in an NFC component of transaction card 230 (e.g., as the NFC component is moved through an electromagnetic field generated by transaction terminal 220 and dynamically causes an amount of electric current to be induced in the NFC component of transaction card 230), thereby facilitating proper orientation of an NFC component of transaction card 230 relative to an NFC component of transaction terminal 220. In addition, this facilitates a user of transaction card 230 to more quickly identify a proper orientation of an NFC component of transaction card 230 and an NFC component of transaction terminal 220, thereby reducing an amount time needed to properly orient the NFC components. Further, this conserves power resources of transaction terminal 220 by reducing an amount of time that transaction terminal 220 needs to generate an electromagnetic field to complete a transaction.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more output components configured to provide one or more sensory outputs; and
   a first near-field communication (NFC) component configured to:
   detect an electric current induced in the first NFC component when the first NFC component is coupled with a second NFC component of another device,
       an amount of electric current induced in the first NFC component being indicative of a strength of coupling between the first NFC component and the second NFC component;
   trigger a first sensory output of the one or more sensory outputs based on a first amount of electric current induced in the first NFC component; and
   trigger a second sensory output of the one or more sensory outputs based on a second amount of electric current induced in the first NFC component satisfying a threshold for a threshold period of time to enable a data transfer between the first NFC component and the second NFC component, the first sensory output and the second sensory output being different.

2. The device of claim 1, where the first NFC component is further configured to:
trigger a third sensory output of the one or more sensory outputs based on a third amount of electric current induced in the first NFC component,
the third sensory output being one or more of a light output, a sound output, or a vibration output.

3. The device of claim 1, where the first amount of electric current is less than the threshold.

4. The device of claim 1, where the first NFC component is further configured to:
provide a communication to the other device based on the second amount of electric current induced in the first NFC component satisfying the threshold.

5. The device of claim 1, where the first NFC component is further configured to:
detect that the first amount of electric current satisfies another threshold; and
where the first NFC component, when triggering the first sensory output, is configured to:
trigger the first sensory output based on detecting that the first amount of electric current satisfies the other threshold.

6. The device of claim 1, where the first NFC component, when triggering the second sensory output, is configured to:
trigger the second sensory output based on modulating the first sensory output from a first intensity to a second intensity,
the first intensity and the second intensity being different.

7. The device of claim 1, where the first NFC component, when triggering the second sensory output, is configured to:
trigger the second sensory output based on modifying the first sensory output from a first type of sensory output to a second type of sensory output,
the first type of sensory output and the second type of sensory output being different.

8. A non-transitory computer-readable medium storing a set of instructions, the set of instructions comprising:
one or more instructions that, when executed by one or more processors or a device, cause the device to:
detect an electric current induced in a first near-field communication (NFC) component, associated with the device, when the first NFC component is couple with a second NFC component associated with another device,
an amount of electric current induced in the first NFC component being indicative of a strength of coupling between the first NFC component and the second NFC component;
trigger a first sensory output from one or more output components of the device based on a first amount of electric current induced in the first NFC component; and
trigger a second sensory output of the one or more output components based on a second amount of electric current induced in the first NFC component satisfying a threshold for a threshold period of time to enable a data transfer between the first NFC component and the second NFC component,
the first sensory output and the second sensory output being different.

9. The non-transitory computer-readable medium of claim 8, where the one or more instructions further cause the device to:
provide, to the second NFC component, a communication based on the second amount of electric current induced in the first NFC component satisfying the threshold.

10. The non-transitory computer-readable medium of claim 8, where the one or more instructions further cause the device to:
determine an error based on determining that the second amount of electric current has been induced in the first NFC component for another threshold period of time without a data transfer occurring between the device and the other device.

11. The non-transitory computer-readable medium of claim 8, where the one or more instructions further cause the device to:
provide, to the second NFC component, a communication based on the second amount of electric current induced in the first NFC component satisfying the threshold for the threshold period of time.

12. The non-transitory computer-readable medium of claim 8, where the one or more instructions, that cause the device to trigger the second sensory output, cause the device to:
modulate the first sensory output by increasing an intensity of the first sensory output to generate the second sensory output.

13. The non-transitory computer-readable medium of claim 8, where the one or more instructions, that cause the device to trigger the second sensory output, cause the device to:
modify the first sensory output by changing the first sensory output from a first type of sensory output to a second type of sensory output to generate the second sensory output.

14. A method, comprising:
detecting, by a device, an electric current induced in a first NFC component of the device when the first NFC component is coupled with a second NFC component of another device,
an amount of electric current induced in the first NFC component being indicative of a strength of a connection between the first NFC component and the second NFC component;
determining, by the device, whether the amount of electric current induced in the first NFC component satisfies a threshold of one or more thresholds; and
dynamically:
triggering, by the device, a first sensory output of one or more sensory outputs of the device based on a first amount of electric current induced in the first NFC component satisfying a first threshold of the one or more thresholds, or
triggering, by the device, a second sensory output of the one or more sensory outputs based on a second amount of electric current induced in the first NFC component satisfying a second threshold, of the one or more thresholds, that is different than the first threshold, for a threshold period of time,
the second amount of electric current satisfying the second threshold for the threshold period of time to enable a data transfer between the first NFC component and the second NFC component.

15. The method of claim 14, where:
the first sensory output is associated with a first intensity of sensory output, and
the second sensory output is associated with a second intensity of sensory output, the first intensity and the second intensity being different.

16. The method of claim 14, where:
the first sensory output is associated with a first type of sensory output, and
the second sensory output is associated with a second type of sensory output,
the first type of sensory output and the second type of sensory output being different.

17. The method of claim 14, further comprising:
determining an error based on determining that the second amount of electric current has been induced in the first NFC component for another threshold period of time without a data transfer occurring between the device and the other device.

18. The method of claim 14, where triggering the second sensory output comprises:
triggering the second sensory output by modifying the first sensory output,
wherein the first sensory output includes a visual indicator.

19. The method of claim 14, further comprising:
providing a communication to the other device based on the second amount of electric current induced in the first NFC component satisfying the second threshold for the threshold period of time.

20. The non-transitory computer-readable medium of claim 8, where the one or more instructions further cause the device to:
activate at least one of the one or more output components to indicate that data was provided to the other device.

* * * * *